United States Patent
Ollefs

(10) Patent No.: US 6,758,285 B2
(45) Date of Patent: Jul. 6, 2004

(54) COUPLING FOR COUPLING PULLED IMPLEMENTS OR TRAILER HAVING A DRAWBAR TO A TRACTOR

(75) Inventor: Horst Ollefs, Moers (DE)

(73) Assignee: GKN Walterscheid GmbH (DE)

( * ) Notice: Subject to any disclaimer, the term of this patent is extended or adjusted under 35 U.S.C. 154(b) by 44 days.

(21) Appl. No.: 10/287,385

(22) Filed: Nov. 4, 2002

(65) Prior Publication Data

US 2003/0085047 A1 May 8, 2003

(30) Foreign Application Priority Data

Nov. 5, 2001 (DE) .......................................... 101 53 823

(51) Int. Cl.⁷ .......................... A01B 59/043; B60D 1/36
(52) U.S. Cl. ...................................... 172/439; 280/508
(58) Field of Search ................................ 172/272, 273, 172/275, 439, 447, 446; 280/477, 497, 498, 504, 508, 509–514

(56) References Cited

U.S. PATENT DOCUMENTS

| | | | |
|---|---|---|---|
| 3,542,399 A | * 11/1970 | Meyers | 172/275 |
| 3,856,331 A | * 12/1974 | Bogdanovich | 280/479.1 |
| 4,343,484 A | * 8/1982 | Van Antwerp | 172/272 |
| 4,377,296 A | 3/1983 | Ulshafer, Jr. | 280/425 R |
| 6,089,328 A | 7/2000 | Moore et al. | |
| 6,193,259 B1 | * 2/2001 | Rupard | 280/508 |

FOREIGN PATENT DOCUMENTS

| | | |
|---|---|---|
| BE | 514 464 | 5/1954 |
| CH | 437 003 | 3/1983 |
| DE | 1 294 707 | 5/1969 |
| DE | 35 14 785 | 10/1986 |
| FR | 1 423 301 | 3/1966 |
| FR | 2 803 560 | 7/2001 |

* cited by examiner

Primary Examiner—Robert E. Pezzuto
(74) Attorney, Agent, or Firm—Harness, Dickey & Pierce, P.L.C.

(57) ABSTRACT

A coupling for coupling, for example, a trailer having a drawbar (2) to a tractor with a three-point linkage device, which has two height-adjustable lower steering arms (3, 4) of which one is laterally adjustable by a lateral strut (11). A first coupling element is mounted on the rear of the tractor. The drawbar (2) is provided with a second coupling element (13). The second coupling element (13) is connectable to the first coupling element (12). The coupling has a bar 14 with two ends. Each end includes a connection element (15) to connect with the lower steering arms (3, 4) of the tractor (1). A guiding mechanism comprises two guiding pins is arranged, distanced from each other, on the bar (14). The guiding bar (14) supports the drawbar (2). The drawbar (2) is guided between the guiding pins (17). The drawbar (2) is adjustable relative to the bar (14) in the longitudinal direction. An abutment (20) mounted on the drawbar belongs to the coupling and limits the longitudinal movement when reversing the tractor (1). The lateral alignment of the second coupling element (13) to the first coupling element (12) can be achieved by shortening and elongating the lateral strut (11).

8 Claims, 1 Drawing Sheet

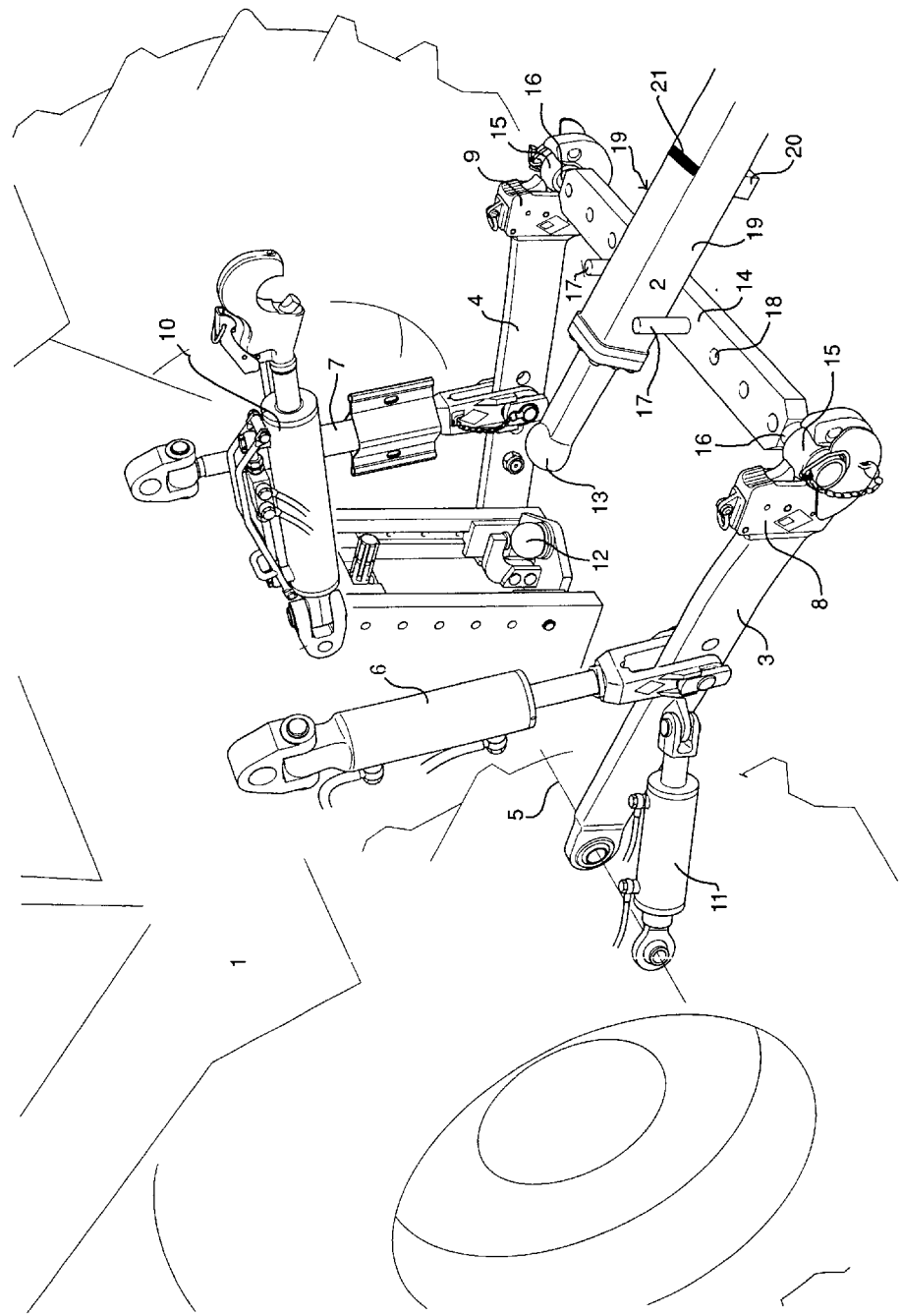

COUPLING FOR COUPLING PULLED IMPLEMENTS OR TRAILER HAVING A DRAWBAR TO A TRACTOR

CROSS-REFERENCE TO RELATED APPLICATION

This application claims priority to German Patent Application No. 10153823.5 filed Nov. 5, 2001, which application is herein expressly incorporated by reference.

BACKGROUND OF THE INVENTION

The invention relates to a coupling that couples a pulled implement or trailer with a drawbar to a tractor. The tractor has a three-point linkage device with two power driven, height-adjustable lower steering arms. At least one arm is laterally pivotable by a power drive. A first coupling element is coupled with a second coupling element which is arranged on the drawbar.

Nowadays, in single-axle or multi-axle trailers the so-called lower linkage is used more and more on tractors. In this linkage a tow-hook, a tie-bolt or a ball is rigidly mounted on the rear of a tractor as a first coupling element. The drawbar of the trailer includes a corresponding second coupling element, which has a trailer coupling ring or a ball socket. During the coupling process, the first coupling element, which is arranged on the tractor, is difficult to see. Because of this reason tow-hook couplings are used. The tow hook coupling includes a tow-bar that carries the first coupling element in the form of a tow-hook, which has a tow-bar pivotable in the horizontal plane, as well as in a vertical plane. The lifting movement is produced by the lifting arms of the power lift. The tow-bar is telescopic so that it is adjustable lengthwise. In order to couple, the tow-bar can be elongated so that the driver of the tractor can determine, from the driver's seat, the approach of the tow-hook to the trailer coupling ring on the drawbar of the to be attached trailer. By actuating the power lift, the tow-hook is lifted and is inserted into the trailer coupling ring of the drawbar. By reversing the coupling process, the tractor tow-bar can be returned to its original length and locked to the rear of the tractor. Such a tow-hook coupling is described in DE-AS 1249707.

U.S. Pat. No. 6,089,328 A discloses a tractor linkage device with two lower steering arms arranged on the rear of the tractor and laterally distanced from each other. The arms are height-adjustable and additionally can be pivoted towards or away from each other. A power lift is provided for the height adjustment. A hydraulic cylinder arranged on each lower steering arm laterally pivots each arm. The length of the hydraulic cylinders can be controlled automatically by a control system.

FR 2 803 560 A1 describes a coupling means for an implement or a trailer with a drawbar to connect to a tractor. The coupling has rocker arms mounted on the drawbar and includes two arms, each provided with a hook, respectively, on its free ends. The hooks engage a lift link draw bar mounted on the lower steering arms. The drawbar is lifted by the lower steering arms. By reversing the tractor, the trailer coupling ring on the drawbar is brought into a corresponding position on a hook on the rear of the tractor. After lowering the drawbar, a connection is achieved between the two. The above described arrangement necessitates, that the driver of the tractor precisely determines when a position is achieved, which enables a coupling of the trailer coupling ring to the tow-hook mounted on the tractor. This is practically impossible from the driver's seat, because of the arrangement on the rear of the tractor.

SUMMARY OF THE INVENTION

An object of the invention is to provide a coupling to couple a pulled implement or trailer with a drawbar to a tractor. The coupling facilitates, by using the three-point linkage device of the tractor, the approach connection between a second coupling element, which is mounted on the drawbar of the implement or of the trailer, and a first coupling element, provided on the rear of the tractor. The coupling has a simple structure.

The coupling couples a pulled implement or trailer with a drawbar to a tractor having a three-point linkage device with two power driven, height-adjustable lower steering arms. At least one arm is laterally pivotable by a power drive. A first coupling element connects with a second coupling element which is arranged on the drawbar. The coupling includes a bar with two ends. A connection element is at both ends of the bar to connect to the lower steering arms of the tractor. A guiding mechanism which serves to orientate the drawbar, enables a relative movement of the draw bar in the longitudinal direction. A travel-limiting mechanism is mountable on the drawbar and limits the relative travel of the drawbar in the longitudinal direction.

Furthermore, the coupling couples a pulled implement or trailer with a drawbar to a tractor having a three-point linkage device with two power driven, height-adjustable lower steering arms. At least one arm is laterally pivotable by a power drive. A first coupling element is connected to a second coupling element that is arranged on the drawbar. The coupling includes a bar with two ends. A connection element is at both ends of the bar to connect to the lower steering arms of the tractor. A guiding mechanism which serves to orientate the drawbar, enables a relative movement of the draw bar in the longitudinal direction. An indicating mechanism is mountable on the drawbar. The indicating mechanism indicates the relative travel of the drawbar to the bar, necessary for coupling the first coupling element to the second coupling element.

An advantage of these couplings is that only one bar received in the coupling hooks of the lower steering arms is necessary. The guiding mechanism for guiding the drawbar, is mounted on the bar. The drawbar rests on the bar and thus can be lifted and lowered by the power lift. The guiding mechanism enables a longitudinal adjustment and relative movement in the longitudinal direction of the drawbar between the drawbar and the bar. Thus, the second coupling element approaches the first coupling element. If this second coupling element is in the range of the first coupling element, which is mounted on the rear of the tractor, the travel-limiting mechanism on the drawbar abut the bar. Accordingly, the lower steering arms can be lowered, whereby the two coupling elements are brought into engagement. The coupling elements described in the state of the art, e.g. tow-hooks, tie-bolts or ball couplings can be used as coupling elements. If a lateral orientation of the second coupling element to the first coupling element is necessary, as the longitudinal axis of the drawbar does not correspond to the longitudinal axis of the tractor, the hydraulically operated lateral strut can be actuated. Here the lower steering arms are laterally pivoted and the second coupling element is aligned with the first coupling element mounted on the tractor.

An indicating mechanism can be used instead of an abutment to limit the relative movement of the drawbar in the longitudinal direction in relation to the bar. The abutment is mountable on the drawbar and abuts the bar. The indicating mechanism to the bar can be seen by the driver of the tractor when he sits on the seat of the tractor. From the position towards the bar, it can be determined whether the second coupling element, which is arranged on the drawbar, has approached the first coupling element in the correct way.

Preferably, the travel-limiting mechanism which is attachable on the drawbar, is provided in form of an abutment, which interacts with the bar. The indicating mechanism can be a marking mountable on the drawbar.

As an improvement of both alternatives according to the invention, the guiding mechanism is represented by two guiding pins. The pins are mountable on the bar distanced from each other. Accordingly, bores are provided in the bar to enable detachable attachment of the guiding pins.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description of the drawings wherein:

The two solutions according to the invention are described in detail by means of the accompanying schematic view of the drawings.

DETAILED DESCRIPTION OF THE PREFERRED EMBODIMENTS

The following description of the preferred embodiment(s) is merely exemplary in nature and is in no way intended to limit the invention, its application, or uses.

The rear of the tractor 1 is given in outlines in the drawing. Furthermore, only the drawbar 2 is visible of the to be attached implement or trailer, respectively. The three-point linkage device arranged on the tractor 1 comprises a first lower steering arm 3 and a second lower steering arm 4. The lower steering arms 3, 4 are arranged laterally offset with respect to the longitudinal axis of the tractor on the rear of the tractor. The two lower steering arms 3, 4 are pivotably attached on a common pivot axis 5. The pivot axis 5 extends transverse to the longitudinal axis of the tractor with an end on the rear of the tractor. The first lower steering arm 3 is connected by a first lift link 6 to a not represented power lift. The first lift link is formed as a hydraulic cylinder. The second lift link 7 connects the second lower steering arm 4 to the not represented power lift. Both lower steering arms 3, 4 can be pivotably lifted or lowered around the pivot axis 5 by the power lift.

The first lower steering arm 3 has on its end distanced from the pivot axis 5 a first coupling hook 8. The second lower steering arm 4 has on its end distanced from the pivot axis 5 a second coupling hook 9. An upper steering arm 10 is mounted above and is laterally centered between the two lower steering arms 3, 4.

A lateral strut 11 is arranged to the first lower steering arm 3. The lateral strut 11 is formed as a double acting hydraulic cylinder. The lateral strut 11 is pivotably mounted around the pivot axis 5 with one end on the rear of the tractor. The other end of the lateral strut 11 is connected to the first lower steering arm 3, distanced from the pivot axis. By elongating or shortening the lateral strut 11, formed as a double acting hydraulic cylinder, the first lower steering arm 3 can be laterally pivoted. Thus, the first lower arm 3 can be moved towards or away from the second lower steering arm 4.

A first coupling element 12 is further mounted on the rear of the tractor 1. In the represented embodiment, the coupling element 12 is in the form of a ball. The ball interacts with a corresponding second coupling element 13 in the form of a ball socket mounted on the drawbar 2. When both are coupled to each other, the engagement condition between the two is secured by a retaining element.

A bar 14 is arranged on the two lower steering arms 3, 4. A connection element 15, in form of a ball, is on both ends of the bar 14. These connection elements 15 are received in the coupling hooks 8, 9 and connect the two lower steering arms 3, 4. The two connection elements 15 sit, respectively, on a trunnion 16.

The bar 14 includes bores 18 which are distributed between the two coupling hooks 8, 9. Corresponding to the width of the drawbar 2, two guiding pins 17 are inserted respectively into one of the bores 18. A distance is formed between the two guiding pins 17. The drawbar 2 is received between the two guiding pins 17. Two side faces 19 on the drawbar 2 can laterally abut the guiding pin 17.

The drawbar 2 rests on the bar 14, when the lower steering arms 3, 4 are in a corresponding lifted position. A travel-limiting mechanism in form of an abutment 20, is mounted at a predetermined distance from the second coupling element 13 on the drawbar 2.

The coupling of the implement or trailer, respectively, is achieved by first reversing the tractor 1 by the driver of the tractor. The lowered steering arms 3, 4, are positioned to receive the drawbar 2 between the two guiding pins 17. As the tractor continues reversing, the second coupling element 13 approaches the first coupling element 12 until the abutment 20 abuts the bar 14. At this time, there is an indication that the second coupling element 13 is in a position above the first coupling element 12, when the two lower steering arms 3, 4 are lifted and carry the drawbar 2. If a coupling of the two couplings elements 12, 13 should not be possible, due to a lateral misalignment, this alignment can be corrected by actuating the lateral strut 11. This shortens or elongates the strut 11. Thus, the bar 14 is laterally displaced. If the correct alignment is achieved, the power lift can be actuated to lower the two lower steering arms 3, 4, in order to engage the two coupling elements 12, 13. Also, the lateral strut 11 can achieve a prealignment in the way that specific positions of the control device are programmed.

Further guiding devices may be provided to facilitate the approach of the second coupling element 13 and the alignment to the first coupling element 12. The guiding device is positioned laterally of the first coupling element 12. The guiding devices guide the second coupling element 13 when it approaches the first coupling element 12. Instead, or in addition to the travel-limiting mechanism, in form of the abutment 20, a marking 21 can be arranged on the drawbar 2 as indicating mechanism. The indicating mechanism is visible from the seat of the tractor and indicates, that the necessary relative position between the two coupling elements 12, 13 in longitudinal direction of the drawbar 2 is achieved.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A coupling for coupling a pulled implement or trailer having a drawbar to a tractor having a three-point linkage device with two power driven, height-adjustable lower steering arms, at least one steering arm is lateral pivotable by a power drive, and a first coupling element connectable with a second coupling element is arranged on the drawbar, the coupling comprising:

a bar having two ends, a connection element at both ends of the bar for connection to the lower steering arms of the tractor;

guiding mechanism for orientating the drawbar and enabling relative movement of the drawbar in the longitudinal direction; and travel-limiting mechanism mountable on the drawbar, said travel-limiting mechanism limits the relative travel of the drawbar in the longitudinal direction.

2. The coupling according to claim 1, wherein the travel-limiting mechanism comprises an abutment mountable on the drawbar and interacting with the bar.

3. The coupling according to claim 1 wherein the guiding mechanism includes two guiding pins which are attachable on the bar, distanced from each other.

4. The coupling according to claim 3, wherein the guiding bar has bores for detachably mounting the guiding pins.

5. A coupling for coupling a pulled implement or trailer having a drawbar to a tractor having a three-point linkage device with two power driven, height-adjustable lower steering arms, at least one steering arm is lateral pivotable by a power drive, and a first coupling element connectable with a second coupling element is arranged on the drawbar, the coupling comprising:

a bar having two ends;

a connection element at both ends of the bar for connection to the lower steering arms of the tractor;

guiding mechanism for orientating the drawbar and enabling a relative movement of the drawbar in the longitudinal direction; and indicating mechanism mountable on the drawbar, said indicating mechanism indicating the relative travel of the drawbar to the bar, necessary for coupling the first coupling element to the second coupling element.

6. The coupling according to claim 5, wherein the indicating mechanism comprises a marking mountable on the drawbar.

7. The coupling according to claim 5 wherein the guiding mechanism includes two guiding pins which are attachable on the bar, distanced from each other.

8. The coupling according to claim 7, wherein the guiding bar has bores for detachably mounting the guiding pins.

* * * * *